C. D. FILKINS.
CONNECTION FOR ELECTRICAL APPARATUS.
APPLICATION FILED APR. 21, 1919.
1,422,429.
Patented July 11, 1922.
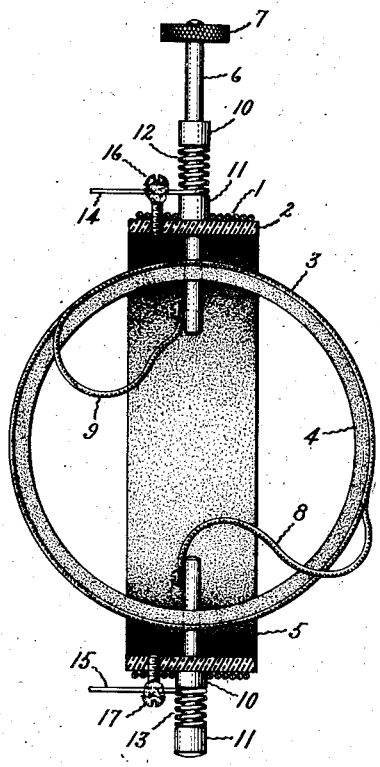
Inventor
Charles D. Filkins,
by Albert G. Davis
His Attorney.

UNITED STATES PATENT OFFICE.

CHARLES D. FILKINS, OF SCHENECTADY, NEW YORK, ASSIGNOR TO GENERAL ELECTRIC COMPANY, A CORPORATION OF NEW YORK.

CONNECTION FOR ELECTRICAL APPARATUS.

1,422,429.     Specification of Letters Patent.      Patented July 11, 1922.

Application filed April 21, 1919. Serial No. 291,608.

*To all whom it may concern:*

Be it known that I, CHARLES D. FILKINS, a citizen of the United States, residing at Schenectady, in the county of Schenectady, State of New York, have invented certain new and useful Improvements in Connections for Electrical Apparatus, of which the following is a specification.

My present invention relates to connections for electrical apparatus, and more particularly to an improved means for making an electrical connection to a movable element in an electrical device.

The object of my invention is to provide a simple, efficient and reliable means for providing an electrical connection to a movable element in an electrical device which will allow any desired freedom of movement of the movable element without interfering with the flow of current to the movable element.

In the construction of variable coupling devices or variometers for use in radio circuits it has been customary to provide a fixed coil and a movable coil which is adapted to rotate with respect to the fixed coil in such a way that the coupling between the two coils may be varied by rotating the movable coil between a position where its plane is parallel with that of the fixed coil and a position where its plane is at right angles to that of the fixed coil. It has been customary in such devices to make electrical connections to the movable coil by means of flexible leads brought from the terminals of the movable coil to fixed terminals located at some convenient place on the apparatus. This method has the disadvantage that it is not possible to rotate the movable coil continuously in one direction, and since the leads are usually located out of sight of the operator there is the danger that the operator will attempt to rotate the coil too far in one direction and break the leads. The leads are also apt to be broken by the continual bending which is incident to the normal operation of the device.

A more specific object of my invention is to provide a method of making the connections to the movable coil of a variometer which will overcome the above-mentioned disadvantages. Still another object of my invention is to provide a means for holding the movable coil in a desired position and prevent it from moving when the apparatus is subjected to shocks or vibration.

In carrying my invention into effect the movable coil is mounted on a pair of trunnions which pass through the support on which the fixed coil is wound and have bearings in this support. The terminals of the movable coil are connected to these trunnions. A pair of collars is provided upon each trunnion and helical spring conductors are provided which surround the trunnions and are held in compression by the collars. In this way an efficient frictional engagement is secured between the trunnions and the spring conductors and the ends of these spring conductors are secured to fixed terminals whereby circuit connections may be made to the movable coil. This frictional engagement of the helical spring conductors with the trunnions also serves to prevent the movable coil from rotating except when it is turned by the operating handle which is secured to one of the trunnions.

The novel features which I believe to be characteristic of my invention are set forth with particularity in the appended claims. The invention itself, however, both as to its organization and method of operation will best be understood by reference to the following description taken in connection with the accompanying drawing in which I have illustrated one way in which my invention may be carried into effect.

I have indicated in the drawing a fixed coil 1 wound upon a suitable support 2 and a movable coil 3 wound upon a support 4. The movable coil with its support is mounted upon trunnions 5, 6, which pass through the support 2 of the fixed coil and have bearings thereon. A handle 7 on one of the trunnions is provided for rotating the movable coil with respect to the fixed coil. The terminals 8 and 9 of the movable coil are connected respectively to trunnions 5 and 6. The trunnions 5 and 6 are provided with collars 10 and 11, and helical spring conductors 12 and 13 surround these trunnions and are held in compression by the collars 10 and 11. This affords a good frictional engagement and electrical contact between the collars and the springs 12 and 13. The ends of these springs 14 and 15 are secured to fixed terminals 16 and 17, these terminals allowing for the connection of the movable coil in the circuit in which it is employed. The frictional engagement between the springs 12 and 13 and the trunnions also prevents the movable coil from changing its position when the apparatus is subjected to shocks and vibration, and thus insures that when the device is once adjusted in a desired position it will retain that adjustment until the operator desires to vary the adjustment.

While I have illustrated a single embodiment of my invention it is apparent that many changes in the form and class of apparatus with which it is employed may be made without departing from the scope of my invention as set forth in the appended claims.

What I claim as new and desire to secure by Letters Patent of the United States, is:—

1. The combination in an apparatus of the class described of a fixed element, a movable element mounted on a trunnion so as to be capable of rotation with respect to said fixed element, and means for making an electrical connection to said movable element comprising a fixed coiled conductor surrounding said trunnion and in frictional engagement therewith.

2. The combination in an apparatus of the class described of a fixed element, a movable element mounted on a trunnion so as to be capable of rotation with respect to said fixed element, a pair of collars on said trunnions and means for making an electrical connection to said movable element comprising a fixed helical spring conductor surrounding said trunnion and held in compression by said collars.

3. The combination in an apparatus of the class described of a fixed coil, a movable coil mounted on a trunnion so as to be capable of rotation with respect to said fixed coil and means for making an electrical connection to said movable coil comprising a fixed helical conductor frictionally engaging said trunnion.

4. The combination in an apparatus of the class described of a fixed coil, a movable coil mounted on a pair of trunnions so as to be capable of rotation with respect to said fixed coil, connections from the ends of said movable coil to said trunnion, coiled conductors frictionally engaging said trunnions and a pair of fixed terminals to which said coiled conductors are connected.

5. The combination in an apparatus of the class described of a fixed coil, a movable coil mounted on a pair of trunnions so as to be capable of rotation within said fixed coil, connections from the ends of said movable coil to said trunnions, coiled conductors frictionally engaging said trunnions and a pair of fixed terminals to which said coiled conductors are connected.

6. The combination in an apparatus of the class described of a fixed coil, a movable coil mounted on a pair of trunnions so as to be capable of rotation with respect to said fixed coil, connections from the ends of said movable coil to said trunnions, a pair of collars on each of said trunnions, a helical spring surrounding each of said trunnions, said springs being held in compression by said collars and a pair of fixed terminals to which said springs are connected.

In witness whereof, I have hereunto set my hand this 19th day of April, 1919.

CHARLES D. FILKINS.